United States Patent
Jagdale et al.

(10) Patent No.: US 11,242,769 B2
(45) Date of Patent: Feb. 8, 2022

(54) ADDITIVELY CONTROLLED SURFACE ROUGHNESS FOR DESIGNED PERFORMANCE

(71) Applicant: United Technologies Corporation, Farmington, CT (US)

(72) Inventors: Vijay Narayan Jagdale, South Windsor, CT (US); Jesse R. Boyer, Middletown, CT (US); Om P. Sharma, South Windsor, CT (US); Evan Butcher, Suffield, CT (US); Lawrence Binek, Glastonbury, CT (US); Bryan G. Dods, Greer, SC (US)

(73) Assignee: Raytheon Technologies Corporation, Farmington, CT (US)

( * ) Notice: Subject to any disclaimer, the term of this patent is extended or adjusted under 35 U.S.C. 154(b) by 411 days.

(21) Appl. No.: 16/221,991

(22) Filed: Dec. 17, 2018

(65) Prior Publication Data

US 2020/0191018 A1 Jun. 18, 2020

(51) Int. Cl.
*F01D 25/24* (2006.01)
*B33Y 10/00* (2015.01)
*B33Y 80/00* (2015.01)

(52) U.S. Cl.
CPC ............. *F01D 25/24* (2013.01); *B33Y 10/00* (2014.12); *B33Y 80/00* (2014.12); *F05D 2230/22* (2013.01); *F05D 2230/30* (2013.01); *F05D 2250/181* (2013.01); *F05D 2250/63* (2013.01)

(58) Field of Classification Search
CPC .......... F01D 25/24; F01D 25/26; F01D 5/143; F04D 29/685
See application file for complete search history.

(56) References Cited

U.S. PATENT DOCUMENTS

| 8,506,836 | B2 | 8/2013 | Szuromi et al. |
| 9,644,639 | B2 * | 5/2017 | Duong .................. F04D 23/008 |
| 9,862,059 | B2 * | 1/2018 | Liebl ................. B23K 15/0086 |
| 10,105,798 | B2 | 10/2018 | Szuromi et al. |
| 2017/0107821 | A1 | 4/2017 | Schwarz |
| 2017/0363011 | A1 | 12/2017 | Dansereau et al. |
| 2018/0023400 | A1 | 1/2018 | Jones et al. |

OTHER PUBLICATIONS

European Search Report dated Apr. 9, 2020 issued for corresponding European Patent Application No. 19217200.5.

* cited by examiner

*Primary Examiner* — David E Sosnowski
*Assistant Examiner* — Sabbir Hasan
(74) *Attorney, Agent, or Firm* — Bachman & LaPointe, P.C.

(57) ABSTRACT

A process for additively controlled surface features of a gas turbine engine casing. The process comprises forming the casing having an inner surface and an outer surface opposite the inner surface; forming a surface feature on the casing proximate the inner surface, wherein the surface feature comprises a structure on the inner surface configured to align or misalign with respect to a flow direction of a working fluid in a flow path of the casing.

7 Claims, 2 Drawing Sheets

ADDITIVELY CONTROLLED SURFACE ROUGHNESS FOR DESIGNED PERFORMANCE

BACKGROUND

The present disclosure is directed to a process for an additively controlled surface roughness of internal flow passages for attritable engine applications.

Attritable or expendable propulsion systems have a short lifespan relative to typical flight applications. The attritable engine is utilized for a limited lifespan and disposed. The attritable gas turbine engine may not even be operated through a full operational cycle. The attritable gas turbine engine may only perform start-up, and operational load before being decommissioned.

Since the operational modes of the attritable gas turbine engine may be significantly less than the conventional gas turbine engine, the attritable engine does not need to meet the same durability or safety requirements as the conventional gas turbine engine. Conventional gas turbine engine manufacturing techniques deployed for attritable engines can be more costly and more complex than needed. Since conventional manufacturing techniques can be more costly, additive manufacturing techniques may be deployed in substitute to reduce cost and complexity of the attritable gas turbine engine.

Flow path components in the attritable engine use as-cast surfaces. The as-cast surface includes surface features with surface roughness. The as-cast surface roughness has associated pressure drop challenges resulting in efficiency reduction or reduction in the useful thrust of the attritable gas turbine engine. Reduction in pressure drop necessitates an increase in the size of the flow regions thereby increasing overall size of the components and thus the engine.

What is needed is a process for an additively controlled surface roughness of internal flow passages for attritable engine applications that can reduce flow losses for attritable engine systems and thus improve efficiency and reduce overall size of the engine or extend range due to increased efficiency.

SUMMARY

In accordance with the present disclosure, there is provided a process for additively controlled surface features of a gas turbine engine casing comprising forming the casing having an inner surface and an outer surface opposite the inner surface forming a surface feature on the casing proximate the inner surface, wherein the surface feature comprises a structure on the inner surface configured to at least one of align and misalign with respect to a flow direction of a working fluid in a flow path of said casing.

In another and alternative embodiment, the surface feature comprises a scallop shaped formation on the inner surface.

In another and alternative embodiment, the scallop shaped formation includes curved edges oriented downstream relative to the flow direction.

In another and alternative embodiment, the surface feature is selected from the group consisting of dimples, ridges, nubs, lumps, protuberances, furrows, voids, gaps, fissures, hollows, trenches, pockets, bumps, lumps, knobs, projections, protrusions, prominences, outcrops, outgrowths, juts, jags, and snags.

In another and alternative embodiment, the surface feature along with the casing by use of additive manufacturing.

In another and alternative embodiment, the process further comprises forming the surface feature extending from the inner surface substantially perpendicular to the flow direction.

In accordance with the present disclosure, there is provided a casing with surface features for an attritable gas turbine engine comprising a flow passage defined within the casing of the gas turbine engine; the flow passage comprising an exterior portion and an interior portion opposite the exterior portion; and the surface feature being formed in the flow passage on an inner surface of the interior portion.

In another and alternative embodiment, the surface feature comprises a structure formed unitary with the interior portion configured to reduce a flow resistance of a fluid flow.

In another and alternative embodiment, the surface feature comprises a plurality of scallop shapes.

In another and alternative embodiment, the surface feature is selected from the group consisting of dimples, ridges, nubs, lumps, protuberances, furrows, voids, gaps, fissures, hollows, trenches, pockets, bumps, lumps, knobs, projections, protrusions, prominences, outcrops, outgrowths, juts, jags, and snags.

In another and alternative embodiment, the surface feature comprises the same material composition as the casing.

In another and alternative embodiment, the surface feature is configured to provide less resistance to a flow of a working fluid.

In accordance with the present disclosure, there is provided a process for forming a casing with a surface feature on a flow passage comprising forming a casing having an inner surface and an outer surface opposite the inner surface; forming a surface feature integral with the casing proximate the inner surface, wherein the surface feature is configured to reduce a flow resistance of a working fluid flowing in the flow passage within the casing.

In another and alternative embodiment, forming the casing and the surface feature comprises model-based additive manufacturing techniques.

In another and alternative embodiment, the forming the surface feature comprises changing process parameters to produce the surface feature within the casing proximate the inner surface.

In another and alternative embodiment, the process further comprises setting a scan strategy for forming the surface feature.

In another and alternative embodiment, the surface feature comprises the same material composition as the casing.

In another and alternative embodiment, the process further comprises melting a feed material with a directed energy into a melt pool; influencing the melt pool in a predetermined direction with respect to a flow direction of the fluid; cooling the melt pool to form the surface feature oriented with respect to the flow direction.

In another and alternative embodiment, the process further comprises altering an energy source direction to make the surface feature in the inner surface, the surface feature being streamlined along a flow direction of the working fluid; and the surface feature following the inner surface of the flow passage formed on the casing.

There is an opportunity to leverage additive manufacturing (AM) techniques to improve various aspects of these limited-life products' lifecycles. These aspects include unitizing assembly details, integration of complex performance-enhancing features, lowering production costs, and reducing time to delivery; typically prohibitive when leveraging conventional manufacturing techniques.

Additive manufacturing enables selection of part build orientation and build process parameter selection which results in an-isotropic response in terms of the surface roughness. The exemplary process utilizes build orientation control to orient the surface roughness in the flow direction (aligned with streamlines) whereby pressure drop is reduced and performance is improved. Directed Energy Deposition (DED) additive manufacturing techniques enable utilization of 5 or 6 axis machines for controlled deposition direction along a desired path. Depending on pressure drop and thrust requirements, a same part geometry can be oriented differently with respect to deposition direction to result in different surface roughness values and its orientation with respect to flow path for a designed performance.

Other details of the process for additively controlled surface roughness of internal flow passages are set forth in the following detailed description and the accompanying drawings wherein like reference numerals depict like elements.

DETAILED DESCRIPTION

Figure 1:
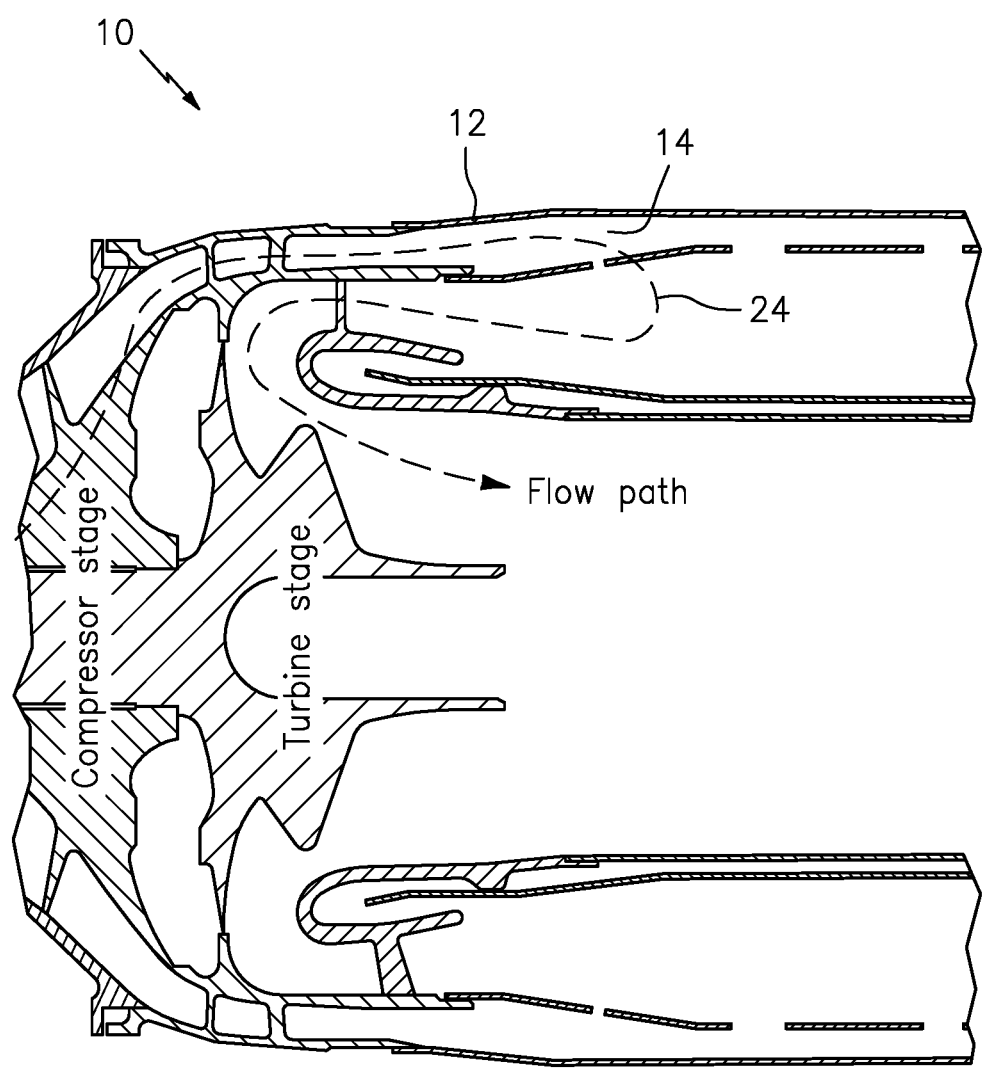
FIG. 1 a cross-sectional schematic representation of sections of a turbine engine.
Figure 5:
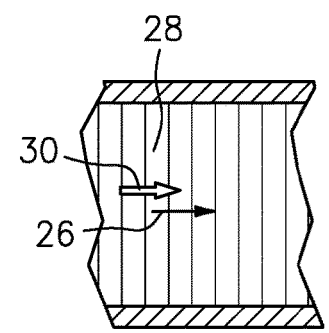
FIG. 5 is a schematic representation of a cross section of an exemplary flow passage.

Referring now to FIG. 1, through FIG. 5, there is illustrated a section of a gas turbine engine 10, such as a compressor stage and a turbine stage. The turbine engine section 10 can include a casing 12. The casing 12 includes flow passages 14 that have an interior portion 16 opposite an exterior portion 18. The interior portion 16 has an inner surface 20 that is opposite an outer surface 22 formed in the exterior portion 18. In an exemplary embodiment, the flow passage 14 has a thickness T that spans from the outer surface 22 to the inner surface 20.

The flow passage 14 can define a flow path that the working fluid 26 utilizes during the function of the gas turbine engine 10. In another exemplary embodiment, in addition to the casing 12, the flow passages 14 can be associated with additional components and sections of the gas turbine engine 10. The flow passage 14 is shown as a cylinder for descriptive purposes, however, any variety of shapes can form the flow passage 14 within the gas turbine engine 10.

The flow passage 14 includes a surface roughness or simply a surface feature 28 formed on the inner surface 20. The surface feature 28 can be formed from the same material as the casing 12. The surface feature 28 aligns with a flow direction 30 of the working fluid 26 in the flow path 24. The surface feature 28 can be misaligned with the flow direction 30, such as at different angles with respect to the flow direction 30, in order to induce a predetermined resistance to flow of the working fluid 26. The surface feature 28 is intentionally formed to enhance the flow of the working fluid 26 through the flow passages 14. The surface feature 28 provides the proper fluid flow characteristics related to surface friction, drag and flow losses along the inner surface 20.

Figure 3:
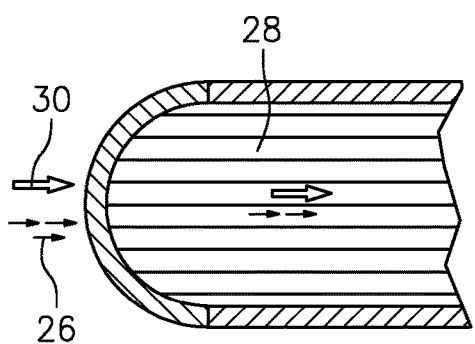
FIG. 3 is a schematic representation of a cross section of an exemplary flow passage.
Figure 4:
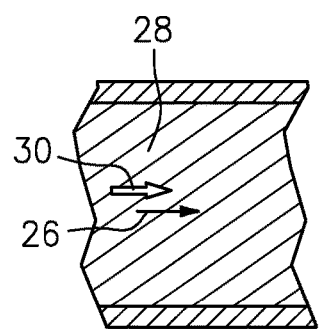
FIG. 4 is a schematic representation of a cross section of an exemplary flow passage.

The surface feature 28 is shown as scallop shaped formations 32 on the inner surface 20. The scallop formations are aligned with the flow direction 30 such that the scallop features 32 lay out along the inner surface 20 with the curved edges downstream relative to the flow direction 30. The surface features 28 resemble surface of the scales of fish and snakes that align in a common direction. The surface features 28 provide less resistance to the flow of the working fluid 26. In other exemplary embodiments, as seen in FIGS. 3, 4, 5, the surface features 28 can be oriented to misalign with the flow direction 30 in order to produce a predetermined flow resistance.

The surface feature 28 is not limited to scallop formations 32. In exemplary embodiments, the surface feature 28 can include dimples, ridges, nubs, lumps, protuberances, furrows, voids, gaps, fissures, hollows, trenches, pockets, bumps, lumps, knobs, projections, protrusions, prominences, outcrops, outgrowths, juts, jags, snags and the like. In an exemplary embodiment, the surface feature 28 can be formed extending from the inner surface 20 substantially perpendicular to the flow direction 30. In an exemplary embodiment, the surface feature 28 can be formed extending from the inner surface 20 at an angle with respect to the flow direction 30.

The surface feature 28 can be formed along with the casing 12 by use of additive manufacturing. In an exemplary embodiment, the surface feature 28 can be formed utilizing model-based additive manufacturing techniques. Those exemplary additive manufacturing techniques can include changing process parameters to produce the surface feature 28 within the casing 12 proximate the inner surface 20.

Figure 2:
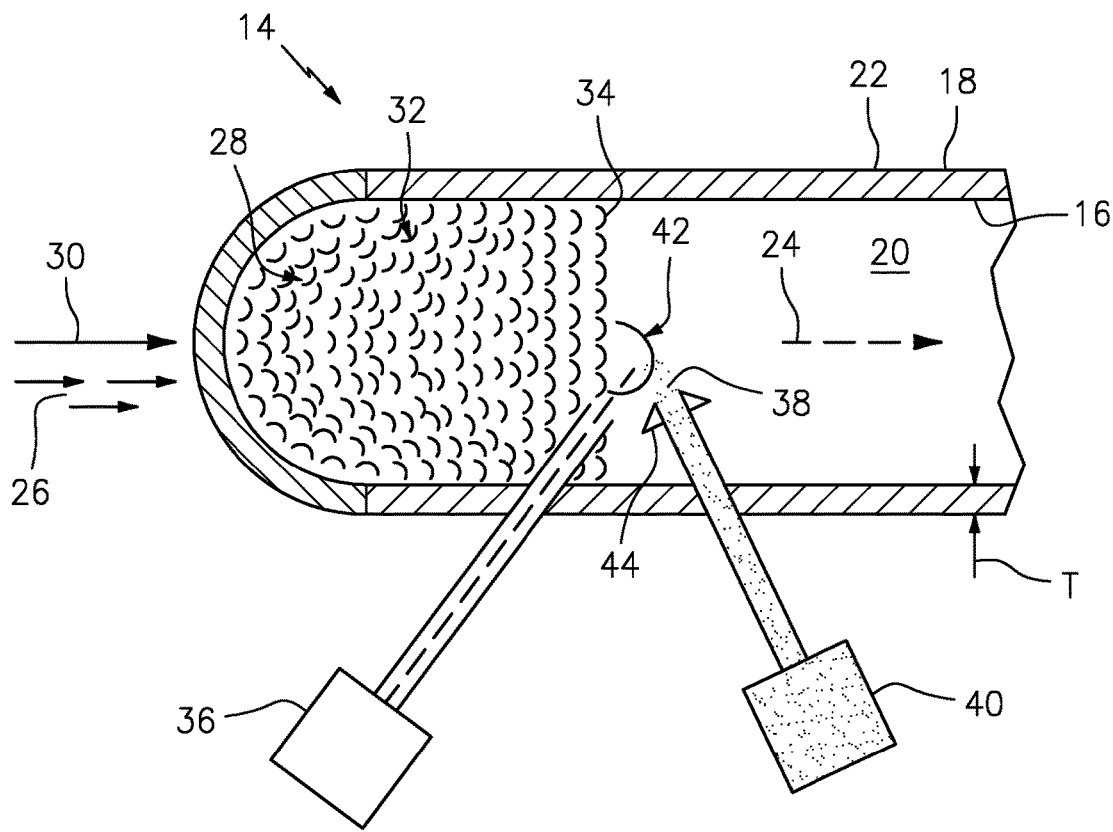
FIG. 2 is a schematic representation of a cross section of an exemplary flow passage.

An exemplary additive manufacturing technique illustrated at FIG. 2 can include utilizing directed energy deposition. An energy source 36 can provide directed energy capable of melting a feed material 38 from a material feeder 40. The energy source 36 can be a laser. The energy source 36 melts the feed material 38 into a melt pool 42. The energy source 36 is directed such that the melt pool 42 is influenced in the direction parallel with the flow direction 30. In directing the melt pool 42 along the flow direction 30 the cooled melt pool 42 forms the scallop formations 32 aligned/oriented downstream with the flow direction 30. In other exemplary embodiments, the directed energy 36 can be utilized to form other surface feature 28 shapes as disclosed above. For example, the energy source 36 direction can be altered to make tracks that are streamlined along the flow direction 30 and follow the inner surface 20 of the flow passage 14.

In another exemplary embodiment, an additive manufacturing technique can include forming the additive material in conical shapes with a rotary motion to form a series of hoops, built-up over each other. The resulting surface feature 28 can include a series of ridges and valleys that reduce the flow resistance along the flow path 24. In another embodiment, the additive manufacturing technique can include a tool head 44 that can machine the inner surface 20 and feed material to the application site.

In an exemplary embodiment, the surface feature 28 can be formed in-situ, on final pass and the like. Additive manufacturing of the surface feature can be done employing direct energy deposition or laser powder bed fusion. Using direct energy deposition, it is possible to build sections of the structure in dissimilar metals which are weldable. A laser powder bed approach would result in the surface feature, integrated with the wall casings being built at the same time. In another exemplary embodiment, one can utilize an L-PBF process, where the part is built and material is added one layer at a time, the laser passes and resultant molten material scallops can be controlled to travel and align with the flow direction and be configured for reducing pressure drop. The scallops if aligned perpendicular to the flow direction would create vortices that would increase pressure drop or loss. By controlling the scanning direction of the laser, the surface roughness can be controlled to provide designed performance enhancement for the gas turbine engine.

The surface feature provides the advantage of a reduction in pressure drop and improvement in the gas turbine engine performance.

The process for additively controlled surface features provides the advantage of a reduction or avoidance of post additive build surface roughness processing techniques resulting in cost reductions.

The process for additively controlled surface features provides the advantage of enabling utilization of same component geometry for designed performance based on application need.

The process for additively controlled surface features provides the advantage of utilization of coarser additive techniques (e.g. DED Vs L-PBF process) without increasing the requirement on post processing techniques to reduce surface roughness.

There has been provided a process for additively controlled surface features on internal flow passages for attritable engine applications. While the process for additively controlled surface features on internal flow passages has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A casing with surface features for an attritable gas turbine engine comprising:
   a flow passage defined within said casing of the attritable gas turbine engine;
   the flow passage comprising an exterior portion and an interior portion opposite said exterior portion; and
   the surface features being formed in said flow passage on an inner surface of said interior portion, wherein said surface features comprise a structure formed unitary with the interior portion configured to reduce a flow resistance of a fluid flow,
   wherein said surface features are selected from the group consisting of dimples, ridges, nubs, lumps, protuberances, furrows, voids, gaps, fissures, hollows, trenches, pockets, bumps, lumps, knobs, projections, protrusions, prominences, outcrops, outgrowths, juts, jags, and snags.

2. The casing with surface features according to claim 1, wherein said surface features comprise the same material composition as said casing.

3. The casing with surface features according to claim 1, wherein said surface features are configured to provide a predetermined resistance to a flow of a working fluid.

4. A casing with surface features for an attritable gas turbine engine comprising:
   a flow passage defined within said casing of the attritable gas turbine engine;
   the flow passage comprising an exterior portion and an interior portion opposite said exterior portion; and
   the surface features being formed in said flow passage on an inner surface of said interior portion, wherein said surface features comprise a structure formed unitary with the interior portion configured to reduce a flow resistance of a fluid flow, wherein said surface features comprise a plurality of scallop shapes.

5. The casing with surface features according to claim 4, wherein said surface features comprise the same material composition as said casing.

6. The casing with surface features according to claim 4, wherein said surface features are configured to provide a predetermined resistance to a flow of a working fluid.

7. The casing with surface features according to claim 4, wherein said plurality of scallop shapes include curved edges oriented downstream relative to a flow direction of a working fluid in the flow passage of said casing.

* * * * *